J. P. KENDRICK.
AUTOMATIC DIRIGIBLE LIGHT SUPPORT.
APPLICATION FILED AUG. 20, 1914.
1,227,154.
Patented May 22, 1917.
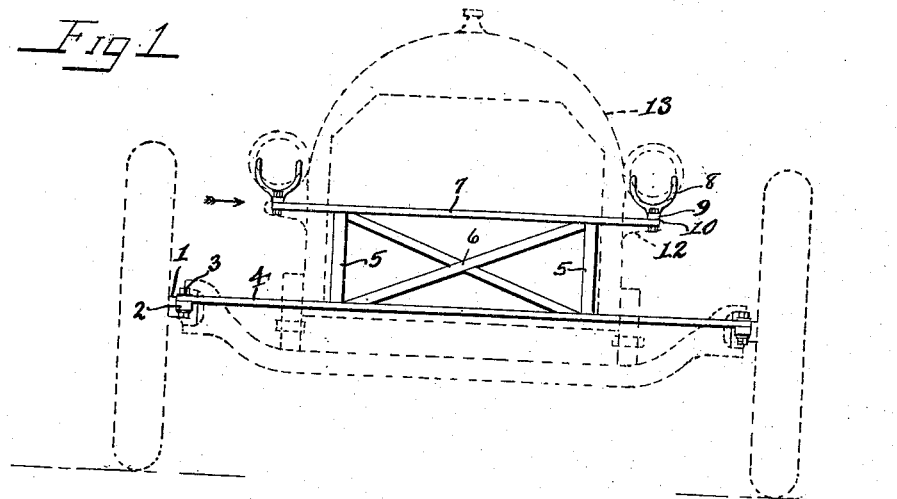
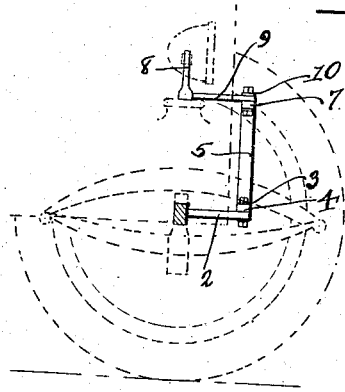
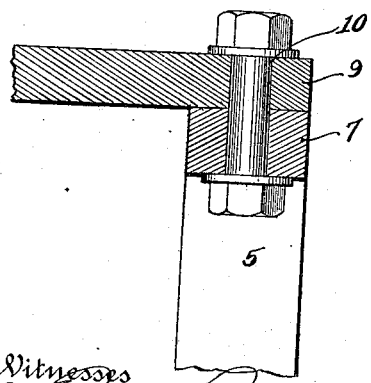
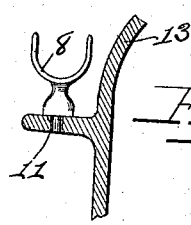

UNITED STATES PATENT OFFICE.

JAMES P. KENDRICK, OF FAYETTE, MISSOURI.

AUTOMATIC DIRIGIBLE LIGHT-SUPPORT.

1,227,154.

Specification of Letters Patent.  Patented May 22, 1917.

Application filed August 20, 1914.  Serial No. 857,721.

*To all whom it may concern:*

Be it known that I, JAMES P. KENDRICK, a citizen of the United States, residing at Fayette, in the county of Howard and State of Missouri, have invented certain new and useful Improvements in Automatic Dirigible Light-Supports, of which the following is a specification.

This invention relates to illumination and more specifically to automatic dirigible light supports.

The object of my invention is to automatically control the movement of the lamps of an automobile so that the rays therefrom will light the track in the precise direction in which the automobile is proceeding, whether going around a curve or traveling in a straight line. The advantage thus gained tends to minimize the liability to accidents so often due to the stationary light supports which do not light the road ahead when proceeding around a curve. My device is simple in construction and may be applied to any make of automobile without altering the form of construction of the parts.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claim appended hereunto and forming a part of this application.

Referring now to the drawings which are merely illustrative of my invention Figure 1 is a front elevation of my device applied, while Fig. 2 is a side elevation of the same. Fig. 3 is a fragmental cross-section of the pivotal point 10, looking in the direction of the arrow, while Fig. 4 is a fragmental section of the bracket projecting from the hood of an automobile to which the bifurcated lamp support is pivotally mounted.

Referring further to the drawings, wherein similar reference characters designate similar parts throughout the respective views, 1 designates the pivoted hub at the ends of the front axle of an automobile, upon each of which is fixedly mounted a forwardly extending rod 2. Pivotally mounted at 3 at both ends to the free end of said rods 2 is a cross-rod 4. Fixedly mounted upon said cross rod 4, in spaced apart relation, are two upright rods 5 braced preferably by bracket rods 6. A second cross rod 7, parallel to the cross rod 4, is fixedly mounted to the upper ends of upright rods 5, said rod 7 being adapted to extend across the front of an automobile to a point opposite the lamp supports 8 thereof. Rearwardly extending connecting rods 9 are pivotally mounted at 10 at one end thereof to each end of the cross rod 7 and are fixedly mounted at the other end to said lamp supports 8. The said lamp supports 8 are pivotally mounted at 11 to an outwardly extending bracket member 12 integral with the hood portion 13 of an automobile.

It will be observed that in operation, by reason of the fixed position of the forwardly extending rods 2, the entire frame pivotally mounted thereon, and heretofore specifically described, will be moved toward the inside of the curve or turn being made by the automobile to which my device is attached. Hence the upper ends of said frame, being pivotally mounted to rearwardly extending rods 9, which, being fixedly mounted to the lamp supports 8, will turn said supports and the lamp mounted thereon in the direction in which the automobile is proceeding.

The utility, adaptability, and advantages of my improved form of automatic dirigible light supports being obviously apparent, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claim.

What I claim as my invention and desire to secure by Letters Patent is:

In a dirigible lamp for automobiles, the combination with a forward axle, pivots at the sides of the axle for mounting the wheels of an automobile, and a hood for the automobile projecting forwardly from the axle, of arms extending forwardly from said pivots and beyond the front line of the hood, a bracket carried on each side of the hood, lamp holders oscillatable in said brackets, arms extending forwardly from said lamp holders along the side of the hood, and a rigid vertical braced framework pivotally connecting the front ends of both sets of arms.

In testimony whereof I affix my signature in presence of two witnesses.

JAMES P. KENDRICK.

Witnesses:
R. M. BAGBY,
EZRA OVENELL.